United States Patent
Winkelmann et al.

(10) Patent No.: US 6,640,541 B2
(45) Date of Patent: Nov. 4, 2003

(54) MASTER CYLINDER FOR USE IN POWER TRAINS OF MOTOR VEHICLES

(75) Inventors: Ludwig Winkelmann, Erlangen (DE); Rainer Venz, Weisendorf (DE); Ulrich Helfmeier, Berlin (DE); Dieter Adler, Herzogenaurach (DE); Uwe Stratil, Gremsdorf (DE); Thomas Bertelshofer, Ebermannstadt (DE); Karl-Ludwig Grell, Aurachtal (DE); Harald Peschke, Veitsbronn (DE); Roland Welter, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/339,945

(22) Filed: Jan. 10, 2003

(65) Prior Publication Data

US 2003/0097928 A1 May 29, 2003

Related U.S. Application Data

(62) Division of application No. 10/118,650, filed on Apr. 8, 2002, now Pat. No. 6,526,868, which is a division of application No. 09/690,428, filed on Oct. 17, 2000, now Pat. No. 6,446,436.

(30) Foreign Application Priority Data

Oct. 18, 1999 (DE) .......................................... 199 50 082

(51) Int. Cl.[7] ................................................. F16J 1/10
(52) U.S. Cl. ................................ 60/533; 92/84; 92/85 R
(58) Field of Search ................................ 60/533; 92/84, 92/85 R, 172, 248

(56) References Cited

U.S. PATENT DOCUMENTS

| 4,558,630 A | * | 12/1985 | Leppala | 92/85 R |
| 5,499,570 A | * | 3/1996 | Bergelin et al. | 92/84 |
| 5,996,468 A | * | 12/1999 | Grosspietsch | 92/84 |

* cited by examiner

Primary Examiner—Edward K. Look
Assistant Examiner—Thomas E. Lazo
(74) Attorney, Agent, or Firm—Darby & Darby

(57) ABSTRACT

A master cylinder for use in the power train of a motor vehicle to actuate the brakes or the friction clutch is designed to avoid the generation of screeching noise and/or the transmission of stray movements to the piston rod in response to shifting of the piston relative to the housing and relative to the sealing element(s) between the piston and the housing. This can be accomplished by causing the piston to turn relative to the housing and the sealing element(s) during axial movement in the housing and/or by installing one or more dampers between the piston and the housing and/or between the piston and the piston rod. The dampers can constitute separately produced parts and/or specially configured and/or finished surfaces provided on the piston and contacting the housing and/or the sealing element(s). The invention also relates to improvements in the configuration and/or the material(s) of the piston.

20 Claims, 3 Drawing Sheets

MASTER CYLINDER FOR USE IN POWER TRAINS OF MOTOR VEHICLES

CROSS-REFERENCE TO RELATED CASES

This application is a division of application Ser. No. 10/118,650, filed Apr. 8, 2002, now U.S. Pat. No. 6,526,868 which is a division of U.S. patent application Ser. No. 09/690,428 filed Oct. 17, 2000 now U.S. Pat. No. 6,446,436 both of which are hereby incorporated by reference in their entirety.

The disclosure of the commonly owned pending German priority application Serial No. 199 50 082.7 (filed Oct. 18, 1999), as well as of each U.S. and foreign patent and patent application identified in the specification of the present application, is incorporated herein by reference.

BACKGROUND OF THE INVENTION

This invention relates to pumps in general, and more particularly to improvements in hydraulic pumps of the type known as master cylinders. Such master cylinders are utilized in many types of motor vehicles to actuate clutches and/or brakes.

A master cylinder normally comprises a cylindrical housing, a piston which is reciprocable in and defines with the housing a plenum chamber for a supply of hydraulic fluid, a piston rod or push rod which can receive motion from a pedal or from an actuator to shift the piston from a retracted position to an extended position and to thus pressurize and expel pressurized fluid into the cylinders of the brake system or into the cylinder of the clutch actuating mechanism, and at least one spring serving to cause the piston to reassume its retracted position when the operator of the motor vehicle ceases to depress the brake pedal or the clutch pedal or when the operation of the brake or clutch is interrupted by the actuator which receives signals from the control unit for the power train of the motor vehicle.

Published German patent application Serial No. 197 55 548 discloses a master cylinder wherein the piston is movable axially relative to two spaced-apart sealing rings which are sealingly installed in the housing and sealingly engage the piston. A drawback of such master cylinders is that each actuation can involve, or is likely to involve, the generation of often highly pronounced and highly unpleasant screeching, creaking or squealing noises attributable to the absence of any or adequate films of lubricant between the parts (such as the piston and the sealing rings) which must move relative to each other in response to depression of the brake pedal or clutch pedal. Thus, the adhesion between the surface of the piston and the surface(s) of one or more sealing elements is likely to be sufficiently pronounced to cause the generation of readily detectable noise whenever the operator of the motor vehicle decides to move the piston relative to the housing of the master cylinder or when such decision is rendered by the electronic control unit and effected by the actuator of the prime mover in the motor vehicle.

The generation of the just discussed noise can be avoided, or the intensity of such noise can be reduced, by adequate lubrication, i.e., by the establishment of a satisfactory hydrodynamic film of lubricant between the surface or surfaces of the moving part(s) (such as the piston) and the stationary part(s), such as the housing and/or the sealing element(s) of the master cylinder. It has been ascertained that a master cylinder is likely to generate noise regardless of whether its piston is made of steel, aluminum or a plastic material with or without a metallic or plastic jacket. The generation of noise is attributable to the development of oscillations which can or are likely to be sufficiently pronounced to constitute a cause of discomfort to the operator and other occupant(s) of the motor vehicle.

Attempts to overcome such drawbacks of presently known master cylinders by utilizing special lubricants have met with limited success, partly or mainly because it is difficult or impossible to ensure adequate lubrication during the entire useful life of the master cylinder and/or of the arrangement (such as the brake system or the clutch) which is connected with and is actuated by the master cylinder.

Another drawback of many presently known master cylinders is that they are likely to be vibrated by the parts which receive pressurized fluid from the plenum chamber of the housing. For example, if the master cylinder is installed to actuate the disengaging unit (such as a slave cylinder) for a friction clutch in the power train of a motor vehicle, vibrations of the slave cylinder (such vibrations are normally attributable to vibrations of the internal combustion engine in the power train) are a cause of pulsating changes of fluid pressure in the conduit connecting the slave cylinder with the chamber in the housing of the master cylinder. The fluid (such as oil) in the chamber of the housing causes the piston of the master cylinder to vibrate and to transmit such undesirable movements to the piston rod and thence to the clutch pedal or to the actuator, depending upon the nature of the clutch (i.e., whether the clutch is disengaged in response to actuation of a pedal or in response to signals furnished to the actuator by an electronic control circuit). The just discussed oscillations of the piston rod are a cause of discomfort and/or uncertainty to the operator of the motor vehicle and/or a cause of undesirable stressing of the actuator for the clutch.

A power train wherein the clutch is actuated by a master cylinder by way of a slave cylinder is disclosed, for example, in commonly owned U.S. Pat. No. 5,632,706 granted May 27, 1997 to Kremmling et al. for "MOTOR VEHICLE WITH ELECTRONIC CLUTCH MANAGEMENT SYSTEM".

OBJECTS OF THE INVENTION

An object of the invention is to provide a single or dual master cylinder which is constructed and assembled in such a way that movements of its piston(s) relative to the housing (s) are less likely to generate pronounced noise (or any noise) than the movements of the piston(s) in conventional master cylinders for use in the power trains of motor vehicles.

Another object of the invention is to provide a master cylinder the operation of which is satisfactory (such as without the generation of any noise or any appreciable noise) during the entire useful life of the master cylinder and/or of the power train in which the master cylinder is put to use.

A further object of the invention is to provide a master cylinder which is constructed and assembled in such a way that it prevents the transmission of undesirable stray movements from one or more controlled parts (such as a slave cylinder) to the part or parts (such as a pedal or an actuator) serving to actuate the master cylinder.

An additional object of the invention is to provide a simple, inexpensive and reliable solution of the afore-discussed problems associated with the utilization of conventional single or dual master cylinders.

Still another object of the invention is to provide a novel housing-piston combination for use in the above outlined master cylinder.

A further object of the invention is to provide a novel and improved housing-seal-piston combination for use in the improved master cylinder.

Another object of the invention is to provide a novel and improved piston-piston rod combination for use in the above outlined master cylinder.

An additional object of the invention is to provide a novel and improved piston for use in the master cylinder.

Still another object of the invention is to provide a novel and improved method of preventing the generation of noise (or pronounced noise) during actuation of a master cylinder in the power train of a motor vehicle.

A further object of the instant invention is to provide a novel and improved method of preventing the transmission of stray movements from a slave cylinder or from a combustion engine to the piston rod or to the actuator which is utilized to initiate the operation of the improved master cylinder.

Another object of the invention is to provide a motor vehicle wherein the power train employs one or more novel and improved master cylinders.

An additional object of the invention is to provide a novel and improved brake system for use in a motor vehicle.

Still another object of the invention is to provide a novel and improved friction clutch assembly for use in a motor vehicle.

A further object of the present invention is to provide novel and improved methods of making pistons for use in master cylinders for the brakes or clutches of motor vehicles.

Another object of the invention is to provide a novel and improved conduit for use in or in conjunction with the above outlined master cylinder.

SUMMARY OF THE INVENTION

One feature of the present invention resides in the provision of a master cylinder which can be utilized in a motor vehicle and comprises a housing, a piston member which is coaxial with and is movable axially within and defines with the housing a variable-volume chamber, means (such as a piston rod) for moving the piston axially of the housing, at least one sealing member (e.g., an annular seal) interposed between the piston member and the housing, and means for turning the piston member and/or the at least one sealing member relative to the other of these members in response to axial movement of the piston member relative to the housing.

As already mentioned above, the means for moving the piston member relative to the housing can comprise a piston rod, and such piston rod can receive motion from a brake actuating device (such as a pedal) or a clutch actuating device (such as a pedal or an actuator). The piston member is disposed in the housing between the chamber and the piston rod. The latter can be connected with the piston member by a suitable swivel joint, e.g., a cardan joint or another universal joint.

If the sealing member(s) is(are) non-rotatably installed in the housing, the means for turning includes means for rotating the piston member relative to the housing. Such rotating means can comprise at least one at least partially helical internal groove in the housing and at least one follower (e.g., a tooth or an analogous projection) provided on the piston member and being confined in the at least one groove. The piston member can comprise a jacket and a core in the jacket, and the at least one follower can be provided on the core and/or on the jacket.

Broadly stated, the means for turning can comprise an internal thread provided in one of the housing and the piston member, and a complementary external thread mating with the internal thread and provided on the other of the housing and the piston member. The aforementioned projection can be considered or interpreted as constituting a rudimentary thread.

In accordance with one presently preferred embodiment, the means for turning can comprise an internal thread which is provided in the piston member and an external thread provided on a stem (e.g., a part analogous to the stem of an externally threaded bolt) carried by the housing and mating with the internal thread. The means for moving can comprise a piston rod. The piston member of such master cylinder is or can be provided with a first end portion which is connected to the piston rod and a second end portion at the chamber; the internal thread can be provided in an axial bore or hole made in the piston member and extending from its second end portion toward the first end portion, and the stem includes a portion which extends into the hole or bore of the piston member.

The means for turning can further comprise resilient means which reacts against the housing to bear upon the piston member or vice versa and to thus bias the piston member axially of the housing. Such resilient means can serve, or can also serve, to return the piston member from its extended to its starting or retracted position.

The resilient means can include or constitute a bistable spring.

The piston member may but need not be hollow and can be made, at least in part, of a plastic material; such piston member or such part of the piston member can constitute an injection molded article.

The piston member can be constructed and assembled in such a way that it includes an outer portion which is adjacent the internal surface of the housing and means for reinforcing the outer portion of such piston member; for example, the reinforcing means can include or constitute at least one internal brace in the interior of the piston member.

A thrust bearing can be interposed between the piston member and the piston rod; in such master cylinders, that portion of the piston member which is adjacent the bearing has a hardness less than that of the adjacent portion of the bearing.

In accordance with another embodiment of the present invention, the improved master cylinder comprises a housing, a piston member (hereinafter called piston) which is coaxial with and is reciprocable within and defines with the housing a variable-volume chamber for a supply of oil or another suitable hydraulic fluid, means (e.g., including a piston rod) for moving the piston relative to the housing, and at least one sealing member which is interposed between the piston and the housing. The piston has a specially designed or finished surface (hereinafter called patterned surface) which contacts the at least one sealing member and is configured, finished and/or otherwise patterned in a manner to reduce the likelihood of adherence of the piston to the sealing member or members. Such patterned surface can reduce or eliminate the tendency of the piston and the sealing member or members to generate noise in response to movement of the piston and of the housing relative to each other.

At least that portion of the piston which is adjacent to its patterned surface can consist of a plastic material; such portion of the piston can constitute an injection molded article. Alternatively, at least that portion of the piston which is adjacent to its patterned surface can consist of a suitable metallic material.

The piston can include a core and a layer which surrounds at least a portion of the core. At least a portion of the patterned surface can be provided on such layer, and the layer can be made of a plastic material such as a fluorocarbon resin, e.g., polytetrafluorethylene, polyvinylidene fluoride or fluorinated ethylene propylene.

Alternatively, the layer can consist of a mixture of metallic and plastic materials; such mixture can contain nickel and/or polytetrafluorethylene. The mixture can contain between about 5 and 30 percent by weight of plastic material, preferably between about 10 and 15 percent.

It is also possible to make the aforementioned layer of the piston of amorphous carbon; such layer can have a thickness of between about 1 and 10 $\mu$m.

The layer can be applied to the core of the piston in accordance with the zinc phosphating process, and such layer can have a thickness of between about 2 and 7 $\mu$m.

Regardless of its composition, a presently preferred thickness of the layer is in the range of between about 1 and 50 $\mu$m, more preferably between about 2 and 15 $\mu$m and most preferably between about 5 and 10 $\mu$m.

The patterned surface of the piston can be a roughened surface; alternatively, it can exhibit a substantially rhombic, a substantially circular or a substantially polygonal pattern.

Furthermore, the patterned surface can be provided with recesses having a depth in the range of up to 5 $\mu$m, preferably of up to 1 $\mu$m.

Still further, the patterned surface can be defined by a plurality of minute segments each of which has a length and/or width within a range of up to about 1 mm, preferably within a range of between about 1 and 100 $\mu$m.

The means for moving can comprise resilient means reacting against the piston or against the housing and bearing upon the housing or the piston to bias the piston axially of the housing; such resilient means can comprise at least one bistable spring.

The piston can be hollow, and at least a portion of the (hollow or solid) piston can consist of a plastic material; for example, the plastic portion of the piston can constitute an injection molded article.

That (outer) portion of the piston which is adjacent the patterned surface can be reinforced, e.g., by one or more internal braces.

If the means for moving the piston comprises or constitutes a piston rod, the improved master cylinder can further embody a thrust bearing which is interposed between the piston and the piston rod. That portion of the piston which is adjacent the thrust bearing exhibits a first hardness, and that portion of the thrust bearing which is adjacent the just mentioned portion of the piston can have a second hardness different from and normally greater than the first hardness.

A further feature of the present invention resides in the provision of a master cylinder which can be utilized in motor vehicles and comprises a housing, a piston which is coaxial with and has an external surface in the housing, means for moving the piston relative to the housing including a piston rod which is connected with one end portion of the piston, and means for damping vibrations in the power train between the piston rod and the external surface of the piston. The other end portion of the piston and the housing define a variable-volume chamber.

The piston can further comprise a core including the one end portion of the piston, and a jacket for the core. The aforementioned external surface is then provided on the jacket and the power train is provided (i.e., it is effective) between the core and the jacket. The damping means can be arranged to damp axial vibrations between the core and the jacket.

The damping means can comprise first and second dampers which are respectively disposed at the first and second end portions of the piston, and at least one of the dampers is or can be confined in the jacket.

The core can be installed for movement relative to the jacket, or vice versa, in the axial direction of the housing, and such master cylinder can further comprise a friction generating device which is arranged to oppose axial movements of the jacket and the core relative to each other.

The means for damping vibrations can include the outer side of the core and the inner side of the jacket of the piston. Such inner and outer sides contact each other.

The core of the piston can comprise a plurality of sections which are movable relative to each other within the jacket, and the damping means can comprise means for biasing the sections of the core against the jacket. For example, the core can comprise two sections which are mirror images of each other, and the means for biasing the two sections away from each other can comprise at least one resilient element which is interposed between the two sections.

The core of the piston can form part of the damping means, and such core can constitute a shock absorber of the damping means.

The piston can be made of one piece, and such one-piece piston can be made of a metallic material.

The one end portion of the piston can be provided with a recess, and the damping means can comprise a damper which overlies the recess and is in contact with the piston rod. Such damping means can further comprise a supply of hydraulic fluid in the recess.

The piston can comprise a hollow cylindrical body which defines a compartment, and the damping means can comprise a supply of damping fluid in the compartment and a damper provided in the hollow body of the piston; such damper seals the compartment and is in contact with the piston rod. Such compartment can have one of its ends sealed by the damper and its other end sealed by a jacket which forms part of the piston. The jacket or the body of such piston can include a shoulder which abuts the damper. If the shoulder is provided on the body of the piston, the latter can further comprise a distancing element which is disposed in the body between the damper and a portion of the jacket. The distancing element can comprise a sleeve having one end portion abutting the damper and another end portion abutting the aforementioned portion of the jacket.

The novel features which are considered as characteristic of the invention are set forth in particular in the appended claims. The improved master cylinder itself, both as to its construction and the modes of assembling, installing and operating the same, together with numerous additional important features and attributes thereof, will be best understood upon perusal of the following detailed description of certain presently preferred specific embodiments with reference to the accompanying drawings.

DESCRIPTION OF PREFERRED EMBODIMENTS

Figure 1:
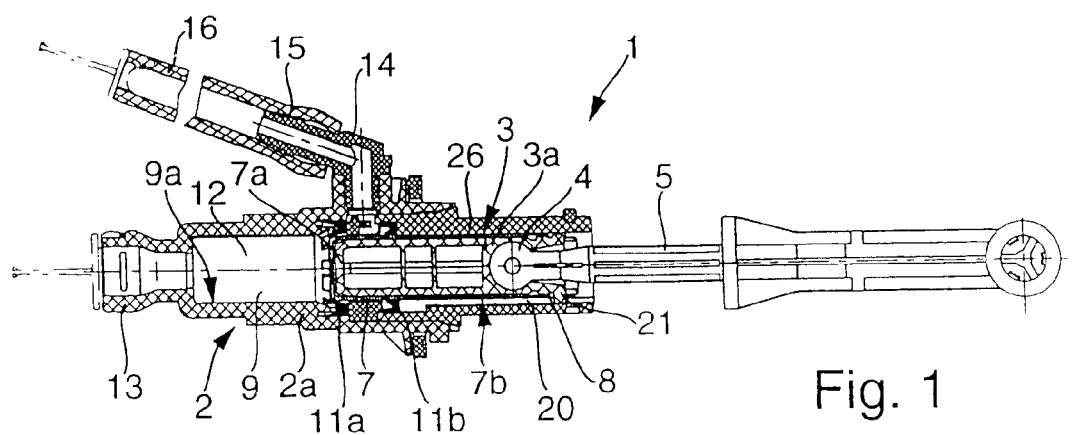
FIG. 1 is a longitudinal axial sectional view of a master cylinder which embodies one form of the invention and wherein the piston is compelled to turn while moving axially of the housing.

The master cylinder 1 of FIG. 1 comprises an elongated cylindrical housing 2, an elongated piston 3 which is reciprocable in the housing 2 and defines therewith a plenum chamber 12 for a supply of hydraulic fluid, and means for moving the piston 3 axially of the cylinder 2. The means for moving comprises a piston rod or push rod 5 and means 4 for articulately connecting the piston rod 5 with that end portion of the piston 3 which is remote from the chamber 12.

The piston 3 comprises a core or body 3a and a jacket or shell 7 which surrounds at least a major part of the core. The housing 2 comprises a front portion or section 2a which surrounds the chamber 12, and a rear portion or section 2b which is or which can be of one piece with the section 2a and serves to guide the jacket 7 of the piston 3 for axial movement between a retracted position (coinciding with or close to that shown in FIG. 1) and an extended position close to a nipple 13 at the front end of the section 2a. If the sections 2a, 2b of the housing 2 are two separately produced parts, they are or they can be sealingly secured to each other by resorting to ultrasonic welding, by resorting to a suitable adhesive, by resorting to a reliable mechanical connection (such as a tongue and groove joint) and/or in any other suitable manner which guarantees the establishment of a long-lasting sealing connection.

The housing sections 2a, 2b can be made of a suitable plastic material, e.g., in an injection molding machine. The same holds true for the core 3a of the composite piston 3; such core can include two or more parts or sections (such as the sections 303a, 303b of the composite piston 303 shown in FIG. 7) which can define a spherical socket for the spherical head of the connecting means 4. The illustrated connecting means 4 is or can constitute a standard universal joint. It is within the purview of the invention to employ any other suitable joint (such as the so-called Cardan joint, also known as Hooke's joint) which enables the piston rod 5 to carry out all necessary swiveling and/or other movements relative to the core 3a.

The means for moving the piston 3 axially of the cylinder 2 further comprises the device or devices which moves or move the piston rod 5. If the master cylinder 1 forms part of a vehicle braking system, the piston rod 5 can be moved forwardly by a brake pedal (not shown) and can be retacted by one or more resilient elements, e.g., by a coil spring mounted in the chamber 12 and analogous to the coil spring 124 forming part of the master cylinder 101 shown in FIG. 4.

If the master cylinder 1 forms part of a friction clutch which is installed between the prime mover (such as a combustion engine) and the transmission in the power train of a motor vehicle, the piston rod 5 can be depressed by a cluch pedal (not shown) or by an electric actuator (not shown in FIG. 1) which receives signals from a control circuit (not shown) Reference may be had, for example, to commonly owned U.S. Pat. No. 5,135,091 granted Aug. 4, 1992 to Albers et al. for "APPARATUS FOR OPERATING CLUTCHES IN MOTOR VEHICLES".

In the master cylinder of FIG. 1, the jacket 7 is coupled with the core 3a of the piston 3 by a snap-on connection 8; however, other types of connections can be resorted to just as well, as long as they can establish a reliable engagement for joint axial movement of the parts 3a and 7. For example, the jacket 7 can be glued, welded or otherwise bonded to the core 3a, and/or it can be partially deformed in an upsetting machine to establish a form-locking connection with the core 3a. Reference may be had to a similar form-locking type of connection (collar 607a) between the core 603a and the jacket 607 of the piston 603 shown in FIG. 10.

Angular movements of the jacket 7 and the core 3a relative to each other can be prevented by resorting to one or more axially parallel tongue-and-groove connections and/or by providing the left-hand end face of the core 3a and the adjacent end wall of the jacket 7 with interfitted complementary profiles. The just mentioned profiling or the establishment of one or more tongue-and-groove conections is optional if the jacket 7 is adequately bonded to the core 3a.

The aforementioned plenum chamber 12 is part of an axial bore or hole 9 which is provided in the housing 2 and is surrounded by a cylindrical internal guide surface 9a closely adjacent to or actually abutting the cylindrical external surface 7b of the jacket 7. The means for establishing a fluidproof seal between the jacket 7 and the section 2b of the housing 2 includes two axially spaced apart ring-shaped sealing members 11a and 11b which are recessed into the internal surface 9a and/or are otherwise reliably secured to the housing to prevent pressurized hydraulic fluid from flowing out of the chamber, between the surfaces 7b, 9a and out of the right-hand end of the housing section 2b.

The nipple 13 of the housing section 2a serves to convey pressurized fluid from the chamber 12 when the piston 3 performs a forward stroke. The fluid which is expelled from the chamber 12 flows through a conduit (not shown) having an intake end coupled with the nipple 13 and serving to admit such fluid into the wheel cylinder or cylinders of a hydraulic brake system, or into a slave cylinder which can disengage a friction clutch between the combustion engine and the transmission in the power train of a motor vehicle.

The section 2a of the housing 2 is further provided with or connected to a second nipple 14 for the end portion 15 of a conduit 16 (e.g., a hose) which connects the chamber 12 with the inlet/outlet of a customary reservoir (not shown) serving to compensate for leakage (if any) of hydraulic fluid and/or to otherwise ensure that the chamber 12 contains a predetermined quantity of hydraulic fluid (e.g., oil) in the fully retracted axial position of the piston 3. The pressure of fluid in the reservoir is selected in such a way that fluid enters the chamber 12 via conduit 16 and nipple 14 as soon as this nipple is free to communicate with the chamber 12 and whenever the pressure of fluid in the chamber is below that in the reservoir. The pressure of fluid in the reservoir can match or exceed atmospheric pressure.

The nipple 14 includes a first part which extends radially of the housing section 2a and a second part which is inclined relative to the first part and is surrounded by and in sealing engagement with the end portion 15 of the conduit 16. This nipple can be of one piece with or it can be rotatably mounted on the housing section 2a so that its orientation can be selected in dependency upon the position of the reservoir with respect to the master cylinder 1.

The illustrated conduit 16 is a flexible hose; however, it is equally possible to employ a corrugated pipe or a conduit which, in accordance with a feature of the present invention, comprises at least two sections or portions disposed end-to-end and made of different materials or of one and the same material but exhibiting different characteristics regarding their strengths, flexibilities and/or other properties. Such novel conduit can be employed in or in conjunction with the improved master cylinder but also in or with numerous other fluid-operated or fluid-conveying (especially hydraulic) systems.

In accordance with one presently preferred proposal, the improved conduit (which can replace the hose 16) includes an end portion (corresponding to the end portion 15 of the hose 16 or to that end portion of this hose which is sealingly connected with the reservoir) made of rubber or another suitable elastomeric material capable of establishing a satisfactory mechanically strong and fluid pressure resistant connection with the nipple 14 or with a nipple of the fluid reservoir. The major portion of the improved conduit which is adapted to be utilized in lieu of the hose 16 can consist of first tubular portions made of an elastomeric material, and second tubular portions which can alternate with the first portions and are made of a material exhibiting a stiffness more pronounced than that of the first tubular portions. For example, the stiffer second tubular portions can be made of polyamide, polypropylene or a similar synthetic plastic material. The first and second (intermediate) tubular portions can alternate with each other between the elastic end portions and can be reliably (sealingly and otherwise) affixed to each other by any suitable technique known for making reliable bonds between different plastic materials.

Certain presently known techniques include the use of adhesives, bonding at elevated temperatures, welding, ultrasonic welding and extrusion. Extrusion can be carried out by resorting to two extruders alternatingly receiving different plastic substances. The transition zones between neighboring first and second tubular portions can be of a flexible nature and one of any two neighboring tubular portions can surround (radially and/or axially) a part of or the entire other neighboring portion. For example, an end portion of the novel conduit can replace the end portion 15 of the conduit 16 shown in FIG. 1 and can include an elastic inner part which is slipped onto the nipple 14, and a stiffer outer part which surrounds and prevents expansion of the elastic inner part. An advantage of such design of one or both end portions of the novel conduit is that it is not necessary to employ customary hose clamps or clips which are utilized when the end portion of an elastic hose is to be reliably maintained in sealing and adequate mechanical engagement with a nipple or the like. For example, such a hose clamp or clip can be utilized to ensure that the end portion 15 of the hose 16 remains in adequate engagement with the nipple 14.

In accordance with another important feature of the invention, the section 2b of the housing 2 has a helical internal groove 20 forming part of means for turning the piston 3 relative to the housing during axial movement toward or away from the nipple 13. The turning means further comprises a follower 21 provided on the core 3a and extending into the groove 20 so that the latter is tracked by the follower in response to axial movement of the piston 3 imparted thereto by the piston rod 5 and joint 4. The groove 20 can constitute or define a coarse or steep thread which can be readily tracked by the follower 21 when the piston rod 5 pushes or pulls the piston 3 axially of the bore or hole 9.

Figure 2:
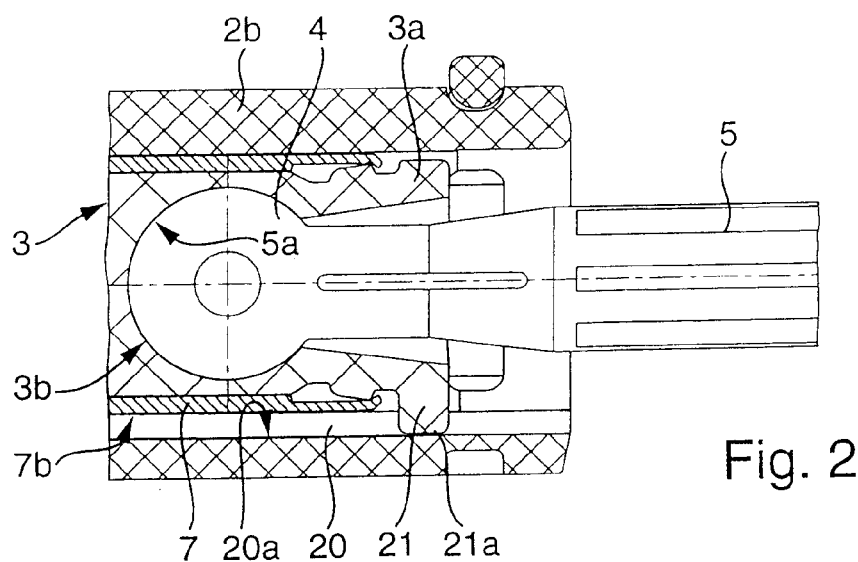
FIG. 2 is an enlarged view of a detail in the master cylinder of FIG. 1.

FIG. 2 shows in greater detail, and drawn to a larger scale, the radially outwardly extending follower 21 and the adjacent portion of the helical groove 20 in the section 2b of the housing 2.

The extent of angular movement of the piston 3 between its fully extended and fully retracted positions can be between 5° and 360°. It is presently preferred to select an angular movement of between 5° and 45° because this renders it possible to move the piston 3 axially within as well as angularly relative to the housing 2 with the exertion of a relatively small force (such force is furnished by the piston rod 5, at least in a direction from the retracted to the extended position of the piston).

Since the external surface 7b of the jacket 7 is compelled to turn relative to the internal surface of the housing 2, and hence relative to the internal surfaces of the sealing members 11a, 11b which cannot rotate relative to the housing, the intensity of screeching noise generated by the surface 7b and the internal surfaces of the sealing members is greatly reduced, normally all the way to zero. Otherwise stated, the transition from frictional engagement of the surface 7b of the jacket 7 with the internal surfaces of the members 11a, 11b to sliding engagement between the surface 7b and the internal surfaces of the sealing members 11a, 11b takes place without the generation of noise which is typical of presently known master cylinders wherein the setting in motion of the piston relative to the housing merely entails an axial movement of the piston.

It will be appreciated that the aforediscussed advantages of the improved master cylinder 1 can be achieved just as satisfactorily, or nearly as satisfactorily, by constructing the improved master cylinder in such a way that the housing rotates (or that at least one of the sealing members 11a, 11b rotates) relative to the piston 3 while the latter is caused to move axially from the retracted to the extended position or vice versa. If the housing is set up to rotate relative to the piston 3, the sealing members 11a, 11b can travel with the piston relative to the housing or such sealing members continue to adhere to the housing while the piston moves axially and simultaneously turns relative to the parts 2, 11a and 11b.

Since the turning means 20, 21 of FIGS. 1 and 2 compels the piston 3 to turn relative to the housing 2 and relative to the sealing members 11a, 11b, and since the piston rod 5 normally does not or should not rotate, the joint 4 between the piston and the piston rod is designed to permit the piston to turn relative to the piston rod. This is accomplished by the aforediscussed expedient of selecting a joint 4 which compels the piston 3 to share the axial movements of the piston rod 5 but permits the piston to turn relative to the housing 2 and sealing members 11a, 11b as well as relative to the piston rod. The abutting complementary spherical surfaces 5a, 3b of the joint 4 are preferably designed in such a way that the extent of friction between such complementary spherical surfaces is minimal or negligible. This can be readily accomplished by appropriate selection of the materials of the parts adjacent the surfaces 3b, 5a and/or by appropriate finish and/or by appropriate lubrication of such surfaces. For example, one can reduce friction between the piston 3 and the piston rod 5 (in addition to or in lieu of adequate lubrication) by making the part(s) adjacent the surface 3b and/or 5a of, e.g., graphite, a ceramic material or a fluorocarbon polymer.

Other undertakings to reduce friction between the piston 3 and the piston rod 5 are equally within the purview of the instant invention. For example, one can employ a suitable bearing, such as an antifriction roller bearing, which is interposed between the surfaces 3b and 5a. Still further, it is possible to reduce friction between the surface 20a bounding the helical groove 20 and the external surface 21a of the follower 21.

An additional important advantage of the feature that the piston 3 must turn relative to the housing 2 and sealing members 11a, 11b in response to axial displacement of the piston rod 5 is that lubrication of the external surface 7b of the jacket 7, of the internal surface 9a of the housing, of the internal surfaces of the sealing members and of the surfaces 3b, 5a at the joint 4 is much less important than the lubrication of surfaces which move relative to each other in conventional master cylinders. For example, lubrication of the surface 7b and of internal surfaces of the sealing members 11a, 11b can be dispensed with in many or most instances.

Figure 3:
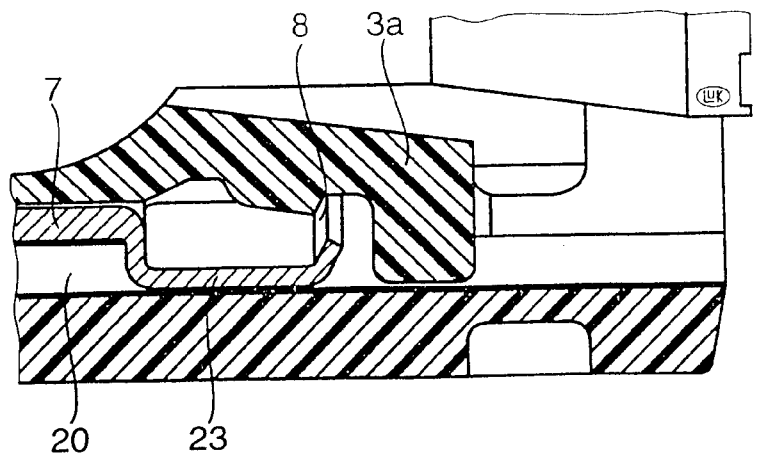
FIG. 3 is an enlarged fragmentary axial sectional view of a detail in a master cylinder constituting a first modification of the master cylinder shown in FIGS. 1 and 2.

FIG. 3 shows an extension 23 which is provided on a modified jacket 7 and is shown as being of one piece with the snap-on connection 8 which latter serves (as in the embodiment of FIGS. 1 and 2) to couple the jacket to the core 3a of the piston 3. The extension 23 can be provided on the jacket 7 of the piston 3 shown in FIGS. 1 and 2 or on a piston which differs from the piston of FIGS. 1 and 2 in that it embodies the extension 23. This extension can serve as a constituent of the snap-on connection in that it contributes to prevention of axial movements between the core 3a and the jacket 7. In addition, the illustrated part of the extension projects into the helical groove 20 of the housing 2 to thus ensure that the piston 3 is compelled to turn in response to axial displacement relative to the housing. In fact, the piston of FIG. 3 can operate without the follower 21. Moreover, the provision of the extension 23 renders it possible to dispense with means for preventing rotation of the jacket 7 and the core 3a relative to each other.

The entire piston can constitute a single piece of plastic material, for example, an injection molded article. Thus, the follower 21 or its equivalent can be of one piece with the other parts or portions of such piston. All that counts is to ensure that the axial movement of the piston from its retracted position (in which the clutch employing the master cylinder 1 is engaged but the brake employing such master cylinder is idle) invariably entails a simultaneous angular movement of the piston relative to the sealing members 11a, 11b. This eliminates the so-called stick-slip effect which is characteristic of conventional master cylinders and is the cause of screeching and/or similar noises when the external surface of the piston in a conventional master cylinder begins to move relative to the adjacent internal surface(s) of the housing and/or sealing member(s).

Otherwise stated, the improved master cylinder ensures the establishment of a different transition from frictional engagement between one or more stationary (internal) surfaces (such as the surface 9a and/or the internal surfaces of the sealing members 11a, 11b) and the (external) surface of the piston to frictional engagement between such surfaces when the piston is caused to move axially relative to the housing and the sealing member(s) of the improved master cylinder. The stick-slip effect which is characteristic of a conventional master cylinder is the cause of noise generating oscillations of the piston and of the entire hydraulic apparatus. Such effect is eliminated or avoided by the novel expedient of ensuring that, when the piston 3 is compelled to move axially, such movement entails (at least at the start of axial movement) an angular movement of the piston relative to the housing 2 and the sealing members 11a, 11b and/or vice versa. The piston 3 on the one hand, and the housing 2 and the sealing members 11a, 11b on the other hand, can turn relative to each other in opposite directions or in the same direction but at different speeds.

It has been found that the simplest solution, or one of the simpler or simplest solutions, is that the piston is caused to turn relative to the housing 2 and sealing members 11a, 11b when the piston rod 5 causes the piston to move axially of the housing, at least during the initial stage of each such axial movement. In such master cylinders, the connection (4) between the piston 3 and the piston rod 5 must be designed to enable the piston to turn relative to the piston rod. However, it is equally possible to establish between the piston and the piston rod a rigid connection if the connection between the piston rod and the part(s) which moves or move the piston rod axially enables or enable the piston rod to turn relative to such part(s) The piston rod 5 is moved axially by a brake pedal if the master cylinder 1 is part of the braking system in a motor vehicle. On the other hand, the piston rod 5 receives axial motion from a clutch pedal or from an actuator (such as an electric actuator) if the master cylinder 1 is associated with a friction clutch, e.g., a friction clutch between the engine and the transmission in the power train of a motor vehicle.

It is often advisable to provide the piston 3 with two or more followers 21 or analogous followers which are spaced apart from each other in the circumferential direction of the piston and each of which extends into a discrete internal groove (20) of the housing 2. The provision of a single groove 20 and at least one follower extending into such single groove contributes to simplicity and lower cost of the improved master cylinder. On the other hand, the provision of two or more grooves and of at least one follower for each groove contributes to reliability and longer useful life of the improved master cylinder. As already mentioned hereinbefore, each follower can form an integral part of a one-piece piston, of the core of a composite piston and/or of the jacket of such composite piston. For example, each helical groove of the housing 2 can receive at least one follower (21) which forms an integral part of the core 3a and at least one follower forming part of the jacket 7. Such arrangement ensures, without any additional undertakings, that the core 3a and the jacket 7 cannot turn relative to each other. The additional undertaking(s) can include the establishment of the aforementioned form-locking connection(s) between the core 3a and the jacket 7.

Figure 4:
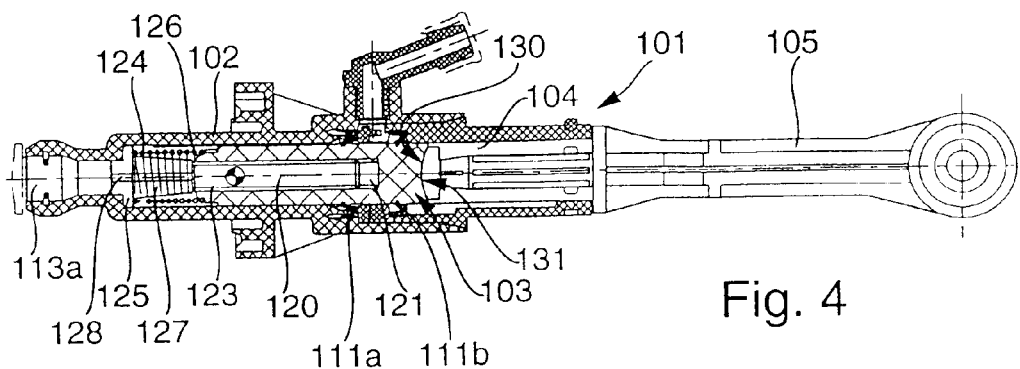
FIG. 4 is an axial sectional view of a master cylinder constituting a second modification of the master cylinder which is shown in FIGS. 1 and 2.

FIG. 4 shows a modified master cylinder 101 wherein a part of the means for turning the piston 103 in response to axial movement of the piston in the housing 102 is confined in the interior of the piston. The piston 103 is made of a plastic material, preferably in an injection molding machine, and its external surface is directly and sealingly engaged by the complementary internal surfaces of the ring-shaped sealing members 111a, 111b. The housing 102 has an axial bore or hole 104 for the piston 103 which latter can receive motion from a piston rod or push rod 105; this piston rod can be moved by the pedal of a brake or by the pedal or actuator for a friction clutch.

That end portion of the piston 103 which is remote from the piston rod 105 is provided with a tapped internal bore or hole 121 which extends toward but short of the other end portion, i.e., toward the joint 104 between the piston and the piston rod. The internal thread in the hole 121 mates with the external thread of a shank or stem (hereinafter called stem) 120 which is secured to or forms part of the housing 102. The composite thread which compels the piston 103 to turn in response to axial movement and which includes the internal thread in the hole 121 and the external thread of the stem 120 is denoted by the character 123. Such composite thread 123 can constitute a steep and/or coarse thread and establishes a form-locking connection between the stem 120 (i.e., the housing 102) and the piston 103. The effect of the thread 123 is the same as that of the composite thread established by the surface 20a bounding the groove 20 and the surface 21a bounding the follower 21 in the master cylinder 1 of FIGS. 1 and 2.

The piston 103 of the master cylinder 101 is shown in the fully extended position in which a resilient element (return spring) 124 in the plenum chamber between the left-hand end portion of the piston and the left-hand end portion of the housing 102 stores a maximum amount of energy. This resilient element (which, in the master cylinder 101 of FIG. 4, constitutes a coil spring) can be said to form part of the means for moving the piston 103 axially because it tends to return the piston to and to maintain the piston in the retracted position in which the plenum chamber receives hydraulic fluid from the channel 113a in the left-hand nipple of the housing 102 (i.e., from the brake cylinder(s) or from the housing of a slave cylinder in a friction clutch), or from the nipple connecting the housing 102 with a fluid reservoir, all as already described above with reference to the master cylinder 1 of FIGS. 1 and 2.

The resilient element 124 reacts against an internal retainer 125 (e.g., a shoulder) of the housing 102 and bears upon an annular external shoulder 126 on the left-hand end portion of the piston 103. The housing 102 is further provided with a frustoconical guide 127 which is surrounded by the convolutions of the resilient element 124 and tapers toward the left-hand end portion of the piston 103. The guide 127 is of one piece with or serves as a base for the left-hand end portion of the stem 120. This guide has a preferably axial bore or hole 128 extending through the retainer 125 and communicating with the aforementioned channel 113a which supplies pressurized hydraulic fluid to the cylinder(s) of the braking system or to the slave cylinder of the clutch actuating means.

The extent of angular displacement of the piston 103 in response to axial movement from the retracted position of FIG. 4 is or can be the same as described with reference to FIGS. 1 and 2, i.e., within the range of between about 5° and 45°. Such selection of the extent of angular displacement of the piston 3 or 103 ensures that the work to be performed by the piston rod 5 or 105 to turn the respective piston is only a small (normally negligible) fraction of the amount of work which is required to move the piston axially between the retracted and extended positions.

Since the resilient element 124 always urges the piston 103 back to the retracted position, the piston rod 105 need not be called upon to retract the piston, i.e., the connection between the piston and the piston rod can be simplified because the latter is merely called upon to push the piston axially from the retracted to the extended position. Nevertheless, it is often desirable and advantageous to connect the piston rod 105 with the piston 103 and/or with the housing 102 in such a way that the piston rod cannot become lost or misplaced. Furthermore, the establishment of a proper connection between the piston rod 105 on the one hand, and the housing 102 and/or piston 103 on the other hand, is desirable because this can greatly simplify the mounting of the master cylinder 101 in the power train of a motor vehicle. For example, the just discussed connection can include or can be constituted by a bellows, not shown. Such bellows renders it possible to dispense with the universal joint 4 of the master cylinder 1. Therefore, it is not necessary to assemble the piston 103 of two or more parts which are necessary if the piston is to define a spherical socket (such as that bounded by the surface 3b shown in FIG. 2) which is required to receive the spherical head of a universal joint of the type shown at 4 in FIGS. 1 and 2.

In lieu of the universal joint 4 of FIGS. 1 and 2, the master cylinder 101 of FIG. 4 comprises a slightly concave surface 130 provided on the exposed side of the rear end portion of the piston 103 and a complementary convex surface 131 provided at the forward end of the piston rod 105. Such configurations enable the piston 103 to turn about its axis relative to the housing 102 as well as relative to the piston rod 105.

It often suffices if at least one convolution at the surface surrounding the axial blind hole 121 of the piston 103 is in mesh with the external thread of the stem 120 of the housing 102 or vice versa.

An important advantage of the piston 103 is that it can consist of a single piece of a suitable material, preferably a plastic material which is shaped in an injection molding machine. The shaping can be carried out in such a way that the blind hole 121 is formed at the time of converting the plastic material into the piston 103. The same applies for the housing 102 and its stem 120, i.e., such parts can be of one piece, they can consist of a suitable plastic material, and they can be made simultaneously, preferably in an injection molding machine. However, it is also possible to mass produce the stem 120 as a separate part which is thereupon affixed to (e.g., anchored in) the housing by resorting to a suitable glueing, welding (such as ultrasonic welding) or other process.

Still further, it is possible to provide the stem 120 with a suitable retainer (replacing the retainer 125 of the housing 102) for the resilient element 124 or an analogous device serving as a return spring adapted to urge the piston 103 to its retracted position. Such stem can resemble a so-called tap bolt having a head which acts as a retainer for the resilient element 124 and an externally threaded shank extending into the blind hole 121 of the piston 103 to center the piston in the housing.

The pressure of fluid in the closed end of the blind hole 121 can match that of fluid in the plenum chamber due to leakage of fluid along the external thread of the stem 120. It is further possible to provide one or more passages (such as channels, bores or the like) which ensure that the pressure of fluid at the closed end of the hole 121 equals the pressure of fluid which is being expelled from the master cylinder 101 via channel 113a.

Still further, it is possible to provide mating male and female threads between the piston 3 or 103 and the piston rod 5 or 105 in such a way that the piston must turn relative to the housing 2 or 102 due to its threaded engagement with the piston rod. For example, the stem 120 and the hole 121 can be omitted if the master cylinder 101 is modified as follows: The piston rod 105 is replaced with a piston rod which is non-rotatably coupled to a brake pedal or to the pedal or actuator of a friction clutch, and such piston rod is provided with a tapped bore or hole receiving an externally threaded rearwardly extending stem of a piston replacing the piston 103. Alternatively, the piston rod can be provided with an external thread and the rear end portion of the modified piston is then provided with a tapped hole or bore receiving the externally threaded part of the piston rod. The piston turns relative to the housing and relative to the sealing member or members in the housing when the piston rod is caused to move the piston axially. The just described modified master cylinder is preferably provided with suitable stops which limit the extent of axial forward and/or rearward movement of the piston relative to the housing.

It is within the purview of the present invention to install the piston in the housing of the improved master cylinder in such a way that the piston can complete at least one full revolution (or several full revolutions) during axial movement between the retracted and the extended positions. However, it is presently preferred to configurate and install the piston in such a way that it can perform only a fraction of a full revolution, i.e., (and as already explained hereinbefore) through an angle of between about 5° and 45°. This renders it possible to move the piston axially with a force which need only slightly exceed the force required to move the piston only axially as in a conventional master cylinder.

Figure 5:
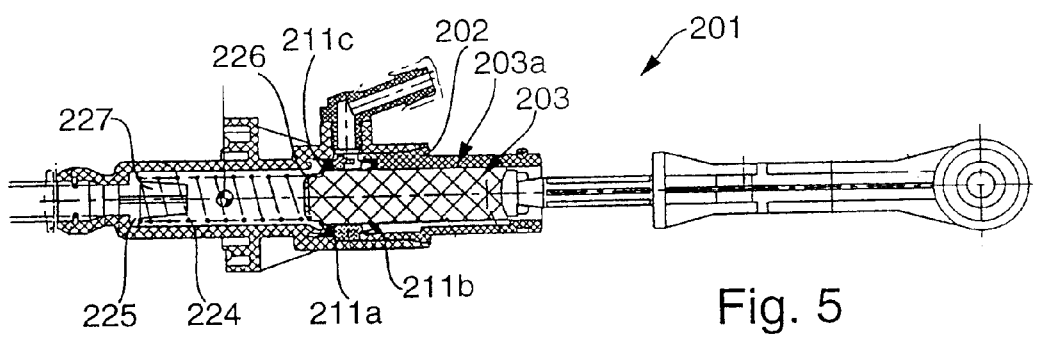
FIG. 5 is an axial sectional view of a master cylinder wherein the piston need not turn relative to the housing.

FIG. 5 shows a master cylinder 201 which constitutes a modification of those shown in FIGS. 1–2, 3 and 4 in that the piston 203 may but need not be compelled to turn relative to the housing 202 and/or relative to the sealing members 211a, 211b during axial movement between its extended and retracted positions. In order to suppress, or to prevent the generation of, screeching and/or other undesirable noises, particularly during the initial stage of its axial movement from the retracted position, the piston 203 has a specially patterned (i.e., configurated) external surface 203a which is in contact with the internal surfaces of the sealing members 211a, 211b and/or with the internal surface of the housing 202.

The piston 203 can be, and preferably is, made of a suitable synthetic material, particularly in an injection molding machine, and its external surface 203a is patterned with a view to avoid the establishment of the aforediscussed stick-slip effect, or to at least weaken such effect, between the external surface of the piston and the internal surfaces of the sealing members 211a and 211b. The stick-slip effect is the primary cause of the noise which develops at least during the initial stage of axial movement of the piston relative to the housing in a conventional master cylinder which does not embody the features exhibited by the aforedescribed master cylinders 1 and 101 and their equivalents and/or the patterned surface 203a of the piston 203.

The patterned surface 203a can exhibit a roughened, rhombic, circular or polygonal finish. The surface 203a can exhibit a basic pattern which is repeated, again and again, over that section or those sections of the surface 203a which comes or come into repeated engagement with the adjacent internal surface of the housing 203 and/or with the internal surfaces of the sealing members 211a, 211b. The dimensions of the area of the aforementioned basic pattern of the internal surface 203a can be within the range of between less than the thickness of a sealing lip 211c at the front end of the piston 203 and/or the thickness of the sealing member 211a and/or 211b and several times such thickness. Furthermore, the spatial dimensions of each part or portion of the basic pattern can be selected in such a way that the individual two-dimensional facets of the aforementioned roughened, rhombic, circular, polygonal or any other suitable pattern are bounded by edges which together form those parts of of the surface 203a that actually contact the internal surface of the housing 202 and/or the internal surfaces of the sealing members 211a, 211b.

For example, the plastic (or other suitable, such as metallic) material adjacent the external surface 203a can be patterned by impressing into such external surface recesses having a diamond-shaped (rhombic), polygonal, circular or another (e.g., composite) outline. Alternatively, the treatment of the originally smooth external surface 203a can be such that the finished (patterned) surface has a plurality (such as a practically infinite number) of raised rhombic, circular, etc. portions.

Still further, it is within the purview of the invention to raise or to depress or remove only the marginal regions or zones of each individual unit or unit area of the patterned surface 203a and to properly select the length and/or the width and/or the depth of such individual unit areas as measured longitudinally, circumferentially and/or radially of the piston 203 or of the sealing members 211a, 211b or the sealing lip 211c. Other parameters which must or should or can be considered in selecting the configuration of the patterned surface 203a can include the viscosity of the hydraulic liquid in the plenum chamber which is defined by the housing 202 and the front end portion of the piston 203, the changes of viscosity as a function of temperature changes, certain empirically determined parameters and/or others. All such parameters are selected or considered to an extent and for the purpose of ensuring that they can and will influence the resonance frequency of the screeching and/or other noises to be eliminated or prevented from developing due to the provision of the patterned surface 203a jointly with or without the provision of means for causing the piston 203 to turn in response to or jointly with axial movement of the piston in the housing 202.

It has been ascertained that an optimum repetition rate of a basic sample pattern of the surface 203a can or should exceed the thickness of the lip 211c (e.g., between 2 and 100 times). Furthermore, it is to be understood that the provision of the aforediscussed noise reducing pattern is not limited to the external surface of the piston and/or to the internal surface of a sealing lip, another sealing member and/or the housing of a master cylinder but can be applied with equal or similar advantage to the surfaces of parts employed in devices other than a master cylinder, e.g., in slave cylinders, in low-amplitude vibration filters and/or in other systems wherein periodic sliding movements of a first part relative to one or more second parts tend to generate undesirable screeching and/or similar noises and/or tend to cause pronounced wear upon the contacting stationary and moving surfaces.

For example, at least one patterned surface of the aforediscussed character can be provided on a component part (such as an annular piston or a solid cylindrical piston) of a slave cylinder in the disengaging unit of a friction clutch wherein a lever (such as a diaphragm spring) permits a pressure plate to move away from the clutch disc. The patterned surface can serve to reduce the likelihood of noise generation and/or to ensure that the disengagement of the friction clutch will necessitate the exertion of a relatively small force. Reference may be had again to the aforementioned U.S. Pat. No. 5,633,704; this patent shows a slave cylinder which is used to disengage a friction clutch in the power train of a motor vehicle. Such slave cylinder can employ a piston having an external surface which is patterned in the aforedescribed manner.

Figure 6:
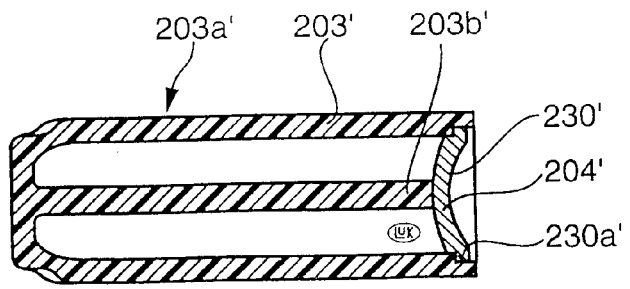
FIG. 6 is an axial sectional view of a piston constituting a modification of the piston in the master cylinder of FIG. 5.

The piston 203 can be made of a thermosetting or a thermoplastic material. In order to reduce the likelihood of shrinkage, this piston can be a hollow tubular member and can be provided with ribs and/or other suitable stabilizing means. FIG. 6 shows a hollow piston 203' having a patterned external surface 203a' and being preferably made of a thermoplastic material. The tubular outer wall 203b' of the piston 203' confines a reinforcing partition or brace 203c' which extends diametrically across the internal space of the piston. The brace 203c' is preferably flanked by two mirror symmetrical halves of the tubular outer wall 203b' of the piston 203'.

The right-hand end face of the brace 203c' serves as an abutment for an end wall or cap 204' which can serve as a thrust bearing for a piston rod 205 (see FIG. 5). The reference character 230a' denotes in FIG. 6 a snap-on connection between the marginal portion of the end wall 204' and the adjacent end portion of the tubular wall 203b' of the piston 203'. The quality of the material of the end wall or thrust bearing 204' can be superior to that of the tubular wall 203b'. For example, the tubular wall 203b' and the partition or brace 203c' can be made of a thermoplastic material and the end wall can be made of a thermosetting material, a fluorocarbon resin or aluminum.

Referring again to FIG. 5, the master cylinder 201 further comprises a resetting or return spring 224 which reacts against a retainer 225 of the housing 202 and bears upon a shoulder or an analogous part 226 of the piston 203 to urge the latter to the retracted position. For example, the part 226 can constitute a radially outwardly extended portion of the piston 203. The spring 224 is centered by a conical member 227 and can be a functional equivalent of a customary bistable spring often utilized in motor vehicles to act upon the clutch pedal. Such bistable springs serve to compensate for irregular pedal forces which are attributable, for example, to leaf springs serving to urge the pressure plate of a friction clutch away from the clutch disc with a force which varies with the extent of movement of the clutch pedal. The utilization of a bistable spring in the force transmitting path between the pedal and the clutch ensures the generation of a force having a predictable and more uniform characteristic curve during each stage of depression of the clutch pedal.

The bistable coil spring 224 operates between the housing 202 and the piston 203 of the master cylinder 201, and the characteristic curve of this spring is or can be selected in such a way that it is possible to dispense with a return spring which acts directly upon the piston rod 205 and/or upon the pedal for this piston rod to urge the piston 203 to its retracted position. Another advantage of the master cylinder 201 is that the spring 224 is installed in the housing 202 so that it is shielded from corrosive influences and need not take up extra space outside of the housing.

To summarize: An advantage of the master cylinder 201 is that the provision of the patterned surface 203a or 203a' at least on that portion of the piston 203 or 203' where such piston contacts the internal surfaces of the sealing members 211a, 211b greatly reduces the likelihood of development of the stick-slip effect, i.e., the tendency of the piston to generate noise and/or to transmit stray (vibratory) movements to the piston rod 205 as a result of repeated pronounced adherence to the sealing member or members.

The piston 203 or 203' can be provided with a highly satisfactory patterned or profiled surface by resorting to a jet blasting, sand blasting, grinding or honing treatment; such treatment can be carried out upon completed making of the piston or in the course of production (making) of such piston. The making can involve a diecasting operation.

Furthermore, the profiled or patterned surface can be provided on a suitable layer or film which is applied to the peripheral surface of the piston 203 or 203' and can be said to form part of the piston. For example, the layer on the external surface of the piston 203 or 203' can be obtained by deposition on such piston (e.g., a metallic or a plastic piston) of a film consisting of a plastic material, for example, a film of a fluoropolymer such as polytetrafluorethylene (PTFE), fluorinated polyethylene (FEP), polyvinylidene fluoride (PVDF) or the like. It is also possible to provide the layer by resorting to a mixture of a plastic substance and a preferably galvanically applied layer of a metallic material (such as nickel or an alloy containing nickel). For example, the layer can consist of between about 15 and 30 percent (preferably between about 10 and 15 percent) by weight of PTFE, the remainder of the layer consisting of nickel.

It is further possible to provide the piston 203 or 203' with a layer of amorphous carbon or with a layer which is applied by resorting to a zinc phosphating technique. Such layers enable the piston 203 or 203' to effectively suppress vibrations and/or other undesirable stray movements, especially from the piston to the piston rod 205 and thence to a pedal or to an actuator. The aforediscussed techniques can be resorted to for the making of layers on pistons as well as on other parts which exhibit an undesirable tendency to vibrate and/or to cause the generation of noise; by way of example, the just discussed layers can be applied to metallic pipes or tubes having a wall thickness in the range of less than about 5 mm. The application of the novel film can result in a tribological separating effect between the surface of a piston or pipe and a sealing member.

The thickness of the layer should conform to the composition and/or the mode of application to the piston 203 or 203'. For example, if the layer consists of amorphous carbon, its thickness should be or can be in the range of between about 1 and 10 $\mu$m, preferably between about 1 and 5 $\mu$m. If the layer contains a mixture of metallic and plastic materials, its thickness is or can be within the range of between about 2 and 15 $\mu$m, preferably between abot 5 and 10 $\mu$m. If the application took place in accordance with the zinc phosphatizing technique, the thickness of the layer can be in the range of between about 2 and 7 $\mu$m, preferably between about 3 and 5 $\mu$m.

It has been found that a treatment of the aforediscussed layers with an emulsion ensures a longer useful life and integrity and enhances the quality of the layer. This holds especially true if the layer has been applied in accordance with the zinc phosphatizing technique.

The patterned or profiled surface 203a or 203a' can assume a predetermined geometrical shape, such as a coarse, rhombic, circular or polygonal configuration. It is also possible to select a piston having for example an amorphous non-structured outline with a laterally statistically distributed outline. For example, the patterned surface can have recesses or depressions or notches with a depth in the range of less than 5 $\mu$m, preferably less than 1 $\mu$m. Furthermore, if the patterning involves a repetition of a basic or elementary pattern, the lateral dimensions and the configuration of the basic pattern are preferably selected with a view to ensure that no resonance frequencies develop in the course of the axial and/or angular movement of the piston 203 or 203' relative to the sealing member(s). This can be readily achieved by selecting the lateral dimensions (length and/or width) in such a way that they amount to less than 1 mm, preferably to between about 1 and 100 μm. Furthermore, such dimensions should be related to the area of contact between the patterned surface 203a or 203a' and the sealing member(s), for example, to the thickness(es) and/or to the diameter(s) of the sealing member(s) forming part of the master cylinder.

Referring again to FIG. 6, the longitudinally extending brace 203c' can be utilized jointly with one or more similar braces which are inclined relative to the illustrated brace; for example, the wall 203b' can confine two braces 203c' which are disposed at an angle of 90° relative to each other. It is also possible to provide one or more internal braces which intersect the longitudinal axis of the wall 203b' and are utilized in addition to or in lieu of the longitudinally extending brace(s) 203c'.

Still further, it is possible to utilize a piston 203 or 203' which can be made of two or more different plastic or other materials in order to reduce the cost. For example, one can employ a high-quality material at the respective patterned surface 203a or 203a', and a less expensive material for the remaining part or parts of the piston. The two or more parts of the composite piston can be (e.g., ultrasonically) welded or otherwise bonded to each other. It is also possible to employ a composite piston wherein the parts are mechanically coupled to each other, e.g., by snap action.

FIGS. 7, 8, 9 and 10 illustrate parts and groups of parts which constitute modifications of certain parts in the master cylinder 201 of FIG. 5. More specifically, FIGS. 7, 8, 9 and 10 respectively show certain details of pistons 303, 403, 503 and 603 as well as the associated piston rods 305, 405, 505 and 605 which can be employed in lieu of the parts 203, 205 in the master cylinder 201. Each of the structures shown in FIGS. 7 to 10 is also designed with a view to prevent, minimize or effectively reduce the generation of noise which develops in conventional master cylinders when the piston is set in motion to pressurize in and to expel pressurized hydraulic fluid from the chamber of the housing in the master cylinder. Such desirable prevention or reduction of noise generation can be arrived at jointly with or independently of the noise eliminating or reducing undertakings described with reference to FIGS. 1 to 4.

Figure 7:
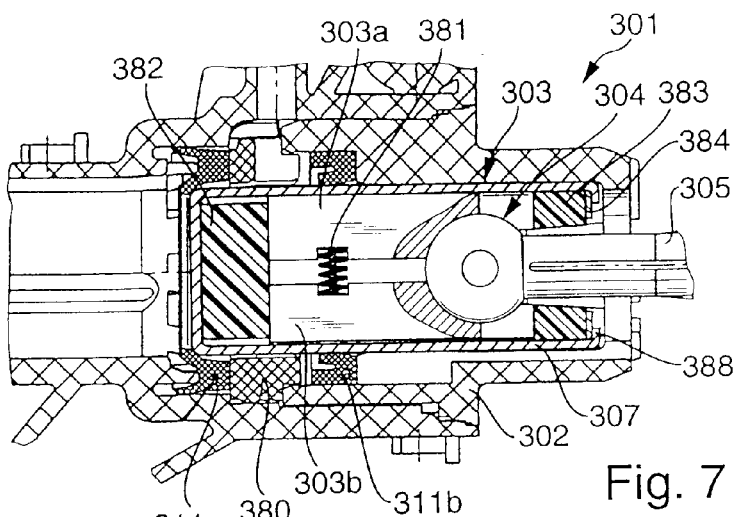
FIG. 7 is a fragmentary axial sectional view of a master cylinder constituting a modification of the master cylinder shown in FIG. 5.

FIG. 7 shows a portion of a master cylinder 301 which includes a housing 302 for a piston 303 and annular sealing members 311a, 311b. The rear end portion of the piston 303 is articulately connected with the piston rod 305. The piston 303 comprises a jacket or shell 307 having a patterned external surface in contact with the internal surfaces of the sealing members 311a and 311b which are anchored in or are otherwise connected to the housing 302 so that they cannot share the axial movements of the piston 303. A distancing ring 380 is provided to hold the sealing members 311a, 311b at a fixed axial distance from each other.

The piston 303 further comprises a composite core composed of two preferably mirror symmetrical sections or shells 303a, 303b. The rear portions of these sections define a socket for the spherical head at the front end of the piston rod 305. A resilient element 381 (such as a coil spring) is provided to urge the sections or halves 303a, 303b of the core in the piston 303 radially and away from each other. Thus, the external surfaces of the sections 303a, 303b are in frictional engagement with the internal surface of the jacket 307; the forces with which the sections 303a, 303b bear upon the jacket 307 depend upon the bias (prestressing) of the spring 381.

The front and rear end portions of the piston 303 are respectively adjacent dampers 382, 383 which serve to oppose (damp) axial movements of the core 303a, 303b relative to the jacket 307. The damper 383 is maintained in an axially fixed position relative to the jacket 307 by a radialy inwardly upset portion or collar 388 of the jacket. A washer 384 is interposed between the damper 383 and the collar 388.

Each of the dampers 311a, 311b can constitute an energy storing element or can include a set of two or more energy storing elements made, for example, of rubber or another elastomeric material. Furthermore, the illustrated solid cylindrical damper 382 and/or the annular damper 383 can be replaced with a coil spring, e.g., a compression or expansion type coil spring. Regardless of their exact shapes and/or make, the dampers as well as the coil spring 381 are or can be installed in the housing 302 in prestressed condition. The coil spring 381 can be utilized jointly with, or can be replaced by, other suitable resilient means capable of urging the sections 303a, 303b of the core radially and away from each other, i.e., against the internal surface of the jacket 307.

Since the dampers 381, 382 oppose axial movements of the core including the sections 303a, 303b in the jacket 307, and the spring 381 maintains the sections 303a, 303b in frictional engagement with the jacket 307, the piston 305 need not be positively (such as form-lockingly) coupled with the jacket without risking the development of excessive noise or any noise when the jacket is caused to move axially relative to the sealing members 311a, 311b.

It is often desirable and advantageous to couple the piston rod 305 and the sections 303a, 303b of the piston 303 against any or any appreciable axial movement relative to each other. This results in the establishment of a shock absorber incuding the parts 303a, 303b, 305, and the jacket 307 of the piston 303 can perform limited axial movements against the opposition of such shock absorber.

The sections 303a, 303b are preferably made of a material having a density different from that of a plastic material. For example, the sections 303a, 303b can be made of metal.

Another advantage of the master cylinder 301 is that it can act as filter for small-amplitude vibrations. Thus, such filter (including the dampers 382, 383 and the spring 381) can prevent stray movements of the engine (via clutch and slave cylinder) from being transmitted to the piston rod 305 and thence to the clutch pedal or to an actuator replacing the clutch pedal. Stray movements could undesirably affect the operation of the actuator and could be a cause of unpleasant experience to the foot operating the clutch pedal. The same holds true when the master cylinder 301 is interposed and acts as a vibration damper between the brake cylinders and the brake pedal in a motor vehicle.

As already explained hereinbefore, the damper 382 and/or 383 can be made, at least in part, of a material which enables the respective damper to function as an effective shock absorber between the core including the parts 303a, 303b and the envelope including the jacket 307. Such selection of the material(s) of the damper 382 and/or 383, combined with the installation of at least one of these dampers in prestressed condition, enables the composite piston 303 to effectively prevent or at least greatly reduce the transmission of undesirable vibratory movements (and hence the propagation of noise) between the core and the jacket. At least one of the dampers 382, 383 can be made of an elastomeric plastic material or can employ one or more coil springs and/or other types of springs which are compressed or expanded when the jacket 307 is caused to move axially relative to the core 303a, 303b and/or vice versa.

In many instances, the piston 203 or 203' (or an equivalent piston wherein the core and the jacket are movable (within limits) axially relative to each other) can be designed and made of one or more materials which enable the piston to exhibit satisfactory rebounding characteristics. Such pistons can be made of, or they can contain FPM, silicone caoutchouc or analogous materials. The same holds true for the piston 303 and its head 304.

The diameter of the opening which is surrounded by the collar 388 of the jacket 307 should be large enough to ensure that the piston rod 305 and the piston 303 can be inclined relative to each other through angles which are necessary to permit for proper manipulation of the device (such as a pedal or an actuator) which is utilized to move the piston axially from the retracted position to a predetermined extended position or to any one of several extended positions. The washer 384 renders it possible to ensure proper retention of the damper 383 even though the width of the collar 388 (as measured radially of the piston axis) is small or even minimal.

The bias of the illustrated helical spring 381 determines the resistance which the external surfaces of the parts 303a, 303b of the core and the abutting internal surface of the jacket 307 offer to axial movements of the core and the jacket relative to each other. Such resistance can be influenced by appropriate patterning of the external surfaces of the parts 303a, 303b and/or of the internal surface of the jacket 307.

Figure 8:
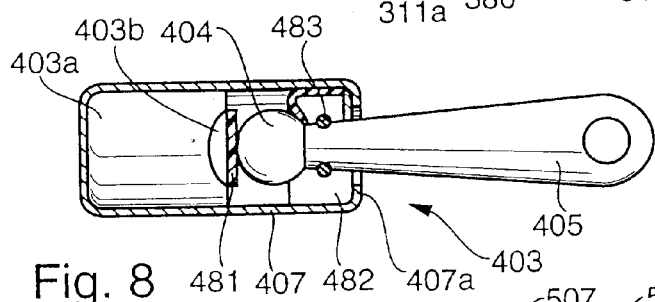
FIG. 8 is a partly elevational and partly axial sectional view of certain details of a master cylinder constituting a first modification of the master cylinder embodying the structure shown in FIG. 7.

FIG. 8 illustrates a piston 403 which cooperates with a piston rod 405. The piston 403 includes a jacket 407 having a closed front end portion adjacent a solid core or body 403a. That end face of the core 403a which confronts the spherical end portion 404 of the piston rod 405 has a recess 403b bounded by a concave surface and containing a supply of hydraulic damping fluid or another damping medium or member. The open side of the recess 403b is sealed by a damper 481 which also acts as a thrust bearing and is engaged by the spherical end portion 404.

The damper 481 is spaced apart from the open rear end of the jacket 407, and such open end is provided with a radially inwardly extending annular collar 407a which serves as a abutment for an annular distancing sleeve 482. The damping medium (e.g., oil or grease) in the recess 403b can be replaced with another viscous fluid (such as a gel) or with a resiliently deformable body such as a high-elasticity insert of silicone caoutchouc or the like. All that counts is to ensure that the viscosity or elasticity of the flowable or resilient material confined in the recess 403b is properly selected to guarantee the establishment of a requisite damping action.

The distancing sleeve 482 reacts against the collar 407a and urges the spherical end portion 404 of the piston rod 405 against the damper (thrust bearing) 481. The collar 407a can constitute a circumferentially complete annulus or it may consist of two or more radially inwardly extending discrete projections forming part of the jacket 407. The axial stress upon the distancing sleeve 482 (namely the stress exerted by the collar 407a) causes this sleeve to bear upon the spherical end portion 404 and to urge the latter against the damper 481 with a pronounced force; however, the piston rod 405 is free to change its angular position relative to the piston 403.

A combined sealing and retaining ring 483 is recessed into an internal groove of the distancing sleeve 482 and engages the adjacent portion of the piston rod 405 to further reduce the likelihood of separation of the piston rod from the damper 481 and also to reduce the likelihood of penetration of dust and/or other foreign matter into contact with the parts 404 and 481.

Retention of the piston rod 405 and damper 481 in optimum axial positions relative to each other can be further ensured by filling the space between the distancing sleeve 482 and the core 403a with an elastically deformable mass, not shown.

An advantage of a master cylinder which embodies the structure of FIG. 8 is that the undesirable stick-slip effect is avoided (and the generation of screeching noise is prevented or reduced to an acceptable value) in a very simple but highly reliable manner. Moreover, the extent to which the likelihood of noise generation is reduced can be regulated, for example, by appropriate selection of the material in the recess 403b and/or of the characteristics of the damper (thrust bearing) 481. In addition, and as already explained hereinbefore, the parts 403, 405 cooperate to prevent the propagation of low-amplitude vibrations and/or other undesirable stray movements from the engine or clutch or brake of a motor vehicle to the piston 403 and thence to the brake pedal, to the clutch pedal or to an actuator.

Figure 9:
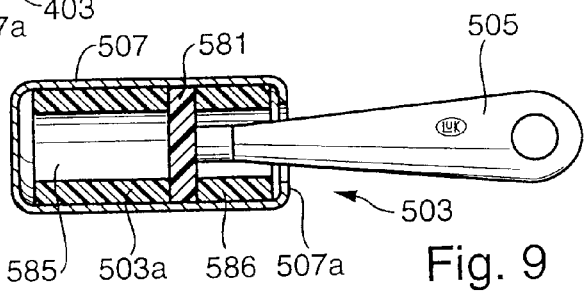
FIG. 9 is a similar view of certain details of a master cylinder constituting a second modification of the master cylinder embodying the structure shown in FIG. 7.

FIG. 9 illustrates a modified combination of a piston 503 and a piston rod 505. The piston comprises a hollow cylindrical core 503a and a cylindrical sleeve or jacket 507 which has a closed forward end portion and surrounds the core 503a. A disc-shaped damper 581 overlies the rear end face of the core 503a and is also confined in and in sealing engagement with the internal surface of the jacket 507. The closed forward end of the jacket 507 and the damper 581 cooperate with the core 503a to define a sealed compartment 585 which is preferably filled with a damping fluid. The damper 581 is held in the illustrated axial position by a distancing sleeve 586 which abuts the radially inwardly extending collar 507a at the rear end of the jacket 507. This damper can consist of a resilient material and can be installed in the jacket 507 (between the core 503a and the distancing sleeve 586) in an at least slightly stressed condition.

The piston rod 505 is force-lockingly engaged by the damper 581 so that it need not be subjected to (and hence need not transmit) axial vibratory action, e.g., low-amplitude vibrations generated by a brake, by a friction clutch and an engine, or by a slave cylinder receiving pressurized hydraulic fluid from the master cylinder embodying the structure of FIG. 9.

Figure 10:
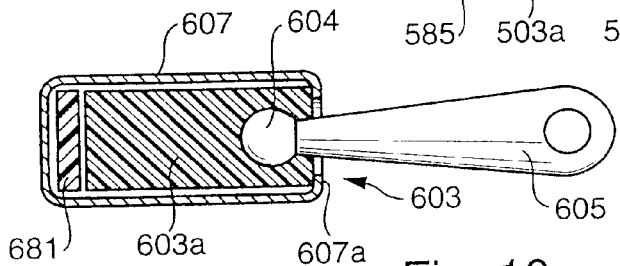
FIG. 10 is a similar view of certain details of a master cylinder constituting a third modification of the master cylinder embodying the structure which is shown in FIG. 7.

Referring to FIG. 10, there is shown a structure which constitutes a simplified version of the structure shown in FIG. 9 and includes a piston 603 and a piston rod 605. The piston 603 comprises a solid cylindrical core or body 603a and a cylindrical sleeve or jacket 607 for the core 603a as well as for an elastically deformable damper 681 between the front end face of the core and the front end wall of the jacket. The rear end face of the core 603a abuts or is closely adjacent a radially inwardly extending (circumferentially complete or composite) collar 607a of the jacket 607.

The piston rod 605 includes a spherical front end portion 604 which is coupled with the rear end portion of the core 603a to constitute therewith a universal joint somewhat resembling that shown in FIG. 8.

The structure of FIG. 10 can prevent the propagation of stray vibratory movements to the piston rod 605 in that the core 603a has a certain freedom of movement relative to the jacket 607. More specifically, the external surface of the core 603a is in frictional engagement with the internal surface of the jacket 607. Such frictional engagement renders it possible to destroy vibration energy. Axial movements of the core 603a and jacket 607 are taken up by the damper 681; the latter can be installed in the jacket in a prestressed condition.

An advantage which is shared by the pistons 403, 503 and 603 is that each thereof can operate satisfactorily with a single damper (481, 581, 681).

The aforementioned dampers 382, 383, 481, 581 and/or 681 can be (and preferably are) made of a suitable plastic material, especially a plastic material which exhibits a low rebounding capacity. Such materials include, among others, fluorocautchouc (FPM), silicone caoutchouc or the like. The damping medium (e.g., fluid) in the compartment or recess 403b and/or 585 can be imparted a desired viscosity or elasticity and can furnish a desired damping action by constituting a mixture of two or more fluids, e.g., multiple-range oils, water, automatic transmission fluid (ATF) and/or others. It is also possible to employ emulsions containing bubbles of air and/or other gaseous fluid(s). The confinement of bubbles of air or another gas enables the fluid in the recess or compartment 403b and/or 585 to exhibit a pronounced softness or yieldability which is desirable and advantageous in certain types of master cylinders.

Still further, it is possible to select the composition and/or the dimensions and/or the configuration of the damper 481 and/or 581 in such a way that the recess or compartment 403b and/or 585 can be filled solely with a body of air or another gaseous fluid.

Figure 11:
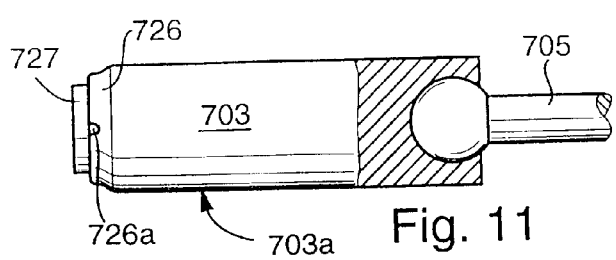
FIG. 11 is a partly elevational and partly sectional view of a piston-piston rod combination which can be utilized in the master cylinder of the present invention.

FIG. 11 illustrates a further combination of a piston (703) and a piston rod (705) which can be utilized in the improved master cylinder. Such master cylinder is especially suited to reduce or eliminate screeching and/or other noises developing when the piston of a conventional master cylinder is caused to move axially away from at least one of its end positions, e.g., from the retracted position. The entire piston 703 is made of a metallic material, e.g., aluminum. The surface 703a of the piston 703 has undergone or can undergo a patterning treatment; alternatively, such surface can be blank, precision turned and/or otherwise subjected to a suitable treatment. For example, one can resort to anodic oxidation, to a hardening treatment and/or to the application of a layer or film consisting of a fluoropolymeric material such as, for example, polytetrafluorethylene (PTEF); this substance enhances the slidability of the piston 703 and weakens is noise-generating tendency.

The piston rod 705 has a spherical head 704 received in a complementary socket provided in the rear end face of the piston 703. The radially outermost portion of that end face of the piston 703 which is remote from the piston rod 705 is provided with a circumferentially complete annular recess 726 with a shoulder which performs the same function as the shoulder 226 of the piston 203 shown FIG. 5. Thus, such recess renders it possible for a hydraulic fluid to flow from the fluid reservoir of the master cylinder employing the structure of FIG. 1 into the plenum chamber defined by the piston 703 and the housing (not shown) of such master cylinder. The admission of hydraulic fluid from the reservoir into the chamber at the left-hand axial end of the piston 703 is further enhanced by the provision of one or more notches 726a machined into the front end face of the piston and communicating with the recess 726.

The front end portion of the piston 703 is further provided with an axial extension 727 which can extend into the rearmost convolution(s) of the customary return spring (not shown in FIG. 11) corresponding to the return spring 124 in the master cylinder 101 of FIG. 4. The extension 727 can further serve as a means for centering the return spring relative to the piston 703 and the housing.

Figure 12:
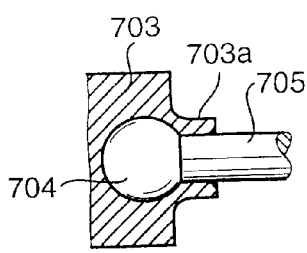
FIG. 12 is a fragmentary partly elevational and partly sectional view of a modification of the combination shown in FIG. 11.

FIG. 12 illustrates another mode of coupling the spherical head 704 at the front end of the piston rod 705 with the rear end portion of a modified piston 703'. The head 704 is turnably but otherwise form-lockingly engaged by a collar 703a' of the piston 703', i.e., the piston must share all axial movements of the piston rod 705 and vice versa. Therefore, the master cylinder which embodies the pison 703' need not employ a return spring (such as the spring 124) and the piston 703' need not be provided with a centering extension corresponding to the extension 727 of the piston 703 shown in FIG. 11.

The features of the various described and illustrated master cylinders can be resorted to individually as well as in numerous combinations with each other without departing from the spirit of the present invention. By way of example only, the axially movable piston 3 of the master cylinder 1 can be provided with one or more patterned surfaces of the type described, for example, with reference to the pistons illustrated in FIGS. 4 to 10. Furthermore, the material(s) of the core and/or jacket of the piston (303) shown, for example, in FIG. 7 can be the same as or different from the material(s) employed in other composite pistons (such as the piston 3 shown in FIGS. 1 and 2), and so on. Still further, the improved master cylinder can be put to use in hydraulic systems which are installed in the power trains of motor vehicles as well as in many other machines, apparatus and the like.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of master cylinders for use in the power trains of motor vehicles and, therefore, such adaptations should and are intended to be comprehended within the meaning and range of equivalence of the appended claims.

What is claimed is:

1. A master cylinder for use in motor vehicles comprising:
 a housing having an axis defining an axial direction;
 a piston coaxial with said housing and having a first end portion, a second end portion and an external surface within said housing, said housing and one of said end portions defining a variable-volume chamber;
 means for moving said piston relative to said housing including a piston rod connected with the other of said end portions of the piston; and
 means for damping vibrations in a power train between said piston rod and said external surface of said piston.

2. The master cylinder of claim 1, wherein said piston further comprises a core including said other end portion and a jacket for said core, said external surface being provided on said jacket and said power train being provided between said core and said jacket.

3. The master cylinder of claim 2, wherein said damping means is arranged to damp axial vibrations between said core and said jacket.

4. The master cylinder of claim 2, wherein said damping means comprises spaced-apart first and second dampers respectively disposed at said first and second end portions of said piston.

5. The master cylinder of claim 4, wherein at least one of said dampers is confined in said jacket.

6. The master cylinder of claim 2, wherein at least one of said core and said jacket is movable relative to the other in the axial direction, and further comprising a friction generating device arranged to oppose axial movement of said jacket and said core relative to each other.

7. The master cylinder of claim 2, wherein said means for damping vibrations includes an outer side of said core and an inner side provided in said jacket and contacting said outer side.

8. The master cylinder of claim 2, wherein said core comprises a plurality of sections movable relative to each other within said jacket and said damping means comprises means for biasing said sections against said jacket.

9. The master cylinder of claim 8, wherein said core comprises two sections which are mirror images of each other, said means for biasing said sections away from each other comprising at least one resilient element interposed between said two sections.

10. The master cylinder of claim 1, wherein said piston further comprises a core including said other end portion and a jacket for said core, said core forming part of said damping means.

11. The master cylinder of claim 10, wherein said core is a shock absorber of said damping means.

12. The master cylinder of claim 1, wherein said piston is of one piece.

13. The master cylinder of claim 12, wherein said one-piece piston consists of a metallic material.

14. The master cylinder of claim 1, wherein said other end portion of said piston has a recess and said damping means comprises a damper overlying said recess and being in contact with said piston rod.

15. The master cylinder of claim 14, wherein said damping means further comprises a supply of hydraulic fluid in said recess.

16. The master cylinder of claim 1, wherein said piston includes a hollow cylindrical body defining a compartment, said damping means comprising a supply of damping fluid in said compartment and a damper provided in said body, sealing said compartment and being in contact with said piston rod.

17. The master cylinder of claim 16, wherein said compartment has a first end sealed by said damper and a second end, said piston further comprising a jacket surrounding said body and sealing the other end of said compartment.

18. The master cylinder of claim 16, wherein said piston further comprises a jacket for said body, one of said jacket and said body having a shoulder abutting said damper.

19. The master cylinder of claim 18, wherein said shoulder is provided on said body and said piston further comprises a distancing element disposed in said body between said damper and a portion of said jacket.

20. The master cylinder of claim 19, wherein said distancing element comprises a sleeve having one end portion abutting said damper and another end portion abutting said portion of said jacket.

* * * * *